Nov. 18, 1941.                L. ROHDE                2,262,966
                    PIEZOELECTRIC CRYSTAL FILTER
                         Filed May 23, 1939
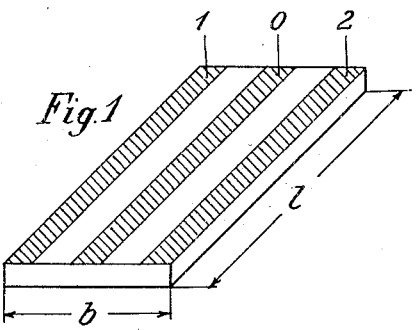
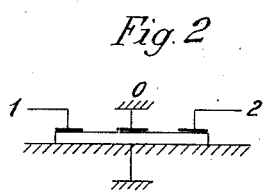
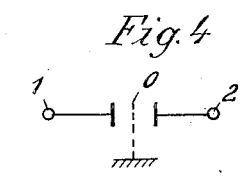
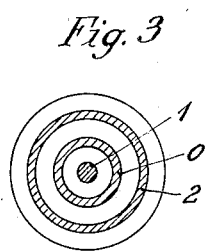
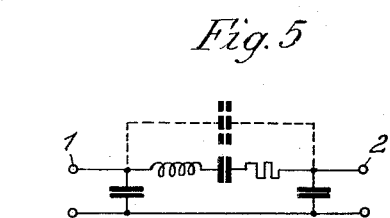
Inventor:
L. Rohde Patented Nov. 18, 1941

2,262,966

UNITED STATES PATENT OFFICE 2,262,966

PIEZOELECTRIC CRYSTAL FILTER

Lothar Rohde, Munich, Germany

Application May 23, 1939, Serial No. 275,324
In Germany June 28, 1938

2 Claims. (Cl. 171—327)

This invention relates to piezo-electric crystals for use in filter networks for separating different frequencies or frequency combinations. The property of series and parallel resonance frequencies renders these crystals suitable for incorporation in filter networks. It is necessary, however, for the purpose of fine separation that the response curve of a crystal should comprise a sharp peak at resonance, and that all frequencies other than those closely adjacent to the actual series resonance frequency should be suppressed as far as possible. Hitherto, however, the inherent parallel capacity of piezo-electric crystals, which determines the parallel resonance frequency of the crystal, has rendered the fine separation of frequencies a difficult matter, and it has in fact been necessary to provide special artificial networks for counteracting the effects of parallel capacity of the crystal.

It is the object of the present invention to provide a piezo-electric crystal which will not be open to this objection. It has been proposed heretofore to prevent a parallel capacity in longitudinally oscillating crystals which are excited at an upper harmonic frequency, but the use of such crystals is very limited and the transmission conditions are unfavourable. The present invention is applicable not only to longitudinally but also to transversely oscillating crystals, and can be employed whether the exciting frequency is the fundamental or a harmonic.

In a piezo-electric crystal filter according to the invention the crystal is provided with a plurality of metal electrodes, the one of which acts as an input electrode and another as an output electrode, these electrodes being so arranged with respect to a third electrode, which acts as screening electrode, that little or no capacitative effects are set up between the input and output electrodes.

Preferably the electrodes are provided on one side only of the crystal, the other side of the crystal being in contact with a metal surface, for instance by being wholly metallised on that side.

Connections to the electrodes are preferably made at points of minimum amplitude of vibration when energised.

Other and further features and objects of the invention will be more readily apparent upon a consideration of the annexed drawing and the following detailed description wherein several exemplary embodiments of the invention are disclosed.

In the drawing:

Fig. 1 is a perspective view of one form of the quartz crystal embodying the invention.

Fig. 2 is a diagrammatic view illustrating the electrode arrangement and the connections for the crystal shown in Fig. 1.

Fig. 3 is a plan view of a modified crystal.

Fig. 4 is a diagrammatic view showing an electric circuit for further explaining the invention.

Fig. 5 is a circuit diagram for further illustrating the electrical principles of the invention.

The crystal shown in Fig. 1 is a longitudinally oscillating crystal; the mechanical movement takes place in the direction $l$ and the electrical axis is parallel to the direction $b$.

One face of the crystal is wholly metallised and the opposite face carries three electrodes $1$, $0$ and $2$ consisting of strips of foil or similar coatings baked into the quartz. The arrangement is shown diagrammatically in Fig. 2. Here the metallic coating to one side of the crystal is represented as an earthed metal surface with which the crystal is in contact.

In use the high frequency input to be filtered is applied between the electrode $1$ and the coating on the other side of the crystal, through suitable connections (not shown) made at points of minimum amplitude of oscillation. The quartz crystal is excited to oscillation, and the mechanical oscillation is imparted to that part of the crystal carrying the electrode $2$ whereupon, by the piezo-electric effect, a high frequency is generated at the output electrode $2$. The crystal, however, will only oscillate when it is excited by an applied frequency in the neighbourhood of the natural frequency of oscillation of the crystal. Thus, if the applied frequencies contain a frequency in the neighbourhood of this natural frequency, the frequency will be filtered through the crystal. The filtered high frequency is taken off from the output electrode $2$ and the coating.

The electrode $0$ is earthed, and for all frequencies other than the natural frequency of oscillation of the crystal the crystal acts as a screened condenser, substantially as shown in Fig. 4 of the drawing. The provision of this screening electrode between input and output electrodes ensures that very few, if any, lines of force from the input electrode reach the output electrode, so that for all frequencies other than the natural frequency there is no transmission of high frequency from the input electrode to the output electrode.

The electrical equivalent of the crystal shown in Fig. 1 is represented in conventional manner in Fig. 5.

In this case the input and output capacities of the crystal are formed by the capacities between the input and output electrodes and the metal coating on the opposite side of the crystal. The parallel capacity shown in dotted lines is practically zero, so that no frequency outside of the natural or resonance frequency of the crystal is transmitted from the input to the output electrode. This is the essential advantage arising from the use of crystals embodying the invention over crystals of the type previously employed.

As already stated, the arrangement shown in Fig. 1 is used primarily for longitudinally oscillating crystals. An arrangement which can be adopted for transversely oscillating crystals is shown by way of example in Fig. 3, wherein the input, screening and output electrodes are concentric. The central electrode may be annular, although not essentially discoid, in form. Moreover, as will be evident to those skilled in the art, provided a crystal has suitable characteristics the concentric disposal of the electrodes can be replaced by parallel strips of foil or of coating material, even for a crystal oscillating transversely.

The electrodes can be applied to the crystal in any desired spacial relation, for instance to conform to special characteristics of the crystal; thus they may be arranged in such a manner that the crystal can be utilised for operation at its upper harmonics.

What I claim as new and desire to secure by Letters Patent is:

1. In a piezo-electric filter, a piezo-electric crystal having a mechanical axis and an electri-axis, an input electrode arranged along one face of the crystal and extending along the mechanical axis of the crystal, an output electrode arranged along the same face of said crystal and extending along the mechanical axis thereof, a screening electrode arranged intermediate the first mentioned electrodes and arranged along the same face of the crystal and extending in the direction of the mechanical axis of the crystal, and a metallic surface carried by the opposite face of the crystal.

2. In a piezo-electric filter, a piezo electric crystal having a mechanical axis and an electrical axis, an electrically conductive strip arranged in flat engagement with one face of the crystal and extending along the mechanical axis thereof, a second flat electrically conductive strip arranged in flat engagement with the same face of the metal crystal spaced from the first strip and extending along the mechanical axis of the crystal, and a third electrically conductive strip arranged in flat engagement with the same face of the crystal intermediate the first and second electrically conductive strips and extending along the mechanical axis of the crystal to serve as a screening electrode and prevent any substantial capacitative effects being set up between the first and second electrically conductive strips.

LOTHAR ROHDE.